(12) United States Patent
Strong et al.

(10) Patent No.: US 11,427,165 B2
(45) Date of Patent: Aug. 30, 2022

(54) TIRE INFLATOR WITH INFLATION TIMER

(71) Applicant: HOPKINS MANUFACTURING CORPORATION, Emporia, KS (US)

(72) Inventors: Lynn Curtis Strong, Auburn, KS (US); James Randolph Kingsbury, Lakewood, CA (US); Chris Auerbach, San Luis Obispo, CA (US); Patrick Lee Ohm, Mesa, AZ (US); Stephen LeVeau, Scottsdale, AZ (US); Michael Williams, Emporia, KS (US)

(73) Assignee: HOPKINS MANUFACTURING CORPORATION, Emporia, KS (US)

(*) Notice: Subject to any disclaimer, the term of this patent is extended or adjusted under 35 U.S.C. 154(b) by 0 days.

(21) Appl. No.: 17/149,940

(22) Filed: Jan. 15, 2021

(65) Prior Publication Data

US 2021/0129802 A1    May 6, 2021

Related U.S. Application Data

(63) Continuation of application No. 15/794,173, filed on Oct. 26, 2017, now Pat. No. 11,027,707.

(60) Provisional application No. 62/413,091, filed on Oct. 26, 2016.

(51) Int. Cl.
*B60S 5/04* (2006.01)
*F04F 5/50* (2006.01)
*F04F 5/48* (2006.01)

(52) U.S. Cl.
CPC ............... *B60S 5/046* (2013.01); *F04F 5/48* (2013.01); *F04F 5/50* (2013.01)

(58) Field of Classification Search
CPC ............... B60S 5/046; F04F 5/48; F04F 5/50
See application file for complete search history.

(56) References Cited

U.S. PATENT DOCUMENTS

| 6,705,360 | B1 ‡ | 3/2004 | Bonzer | B60S 5/046 141/192 |
|---|---|---|---|---|
| 7,889,064 | B2 ‡ | 2/2011 | Petrucelli | B60C 23/0401 340/442 |
| D635,588 | S ‡ | 4/2011 | Sprules | D15/7 |
| 2003/0040843 | A1 ‡ | 2/2003 | Forti | G01L 17/00 700/279 |
| 2007/0237652 | A1 ‡ | 10/2007 | Belanger | B60C 23/04 417/279 |
| 2013/0145834 | A1 ‡ | 6/2013 | Mouchet | B60C 23/0479 73/146.4 |
| 2015/0059918 | A1 ‡ | 3/2015 | Schondorf | B60C 23/0479 141/4 |

‡ imported from a related application

*Primary Examiner* — Daphne M Barry
(74) *Attorney, Agent, or Firm* — Hovey Williams LLP

(57) ABSTRACT

A portable inflation device having a pump, a control device, a user interface, and an inflation indicator. The pump includes an elongated hose with an inflation nozzle. The control device controls operation of the pump and is configured to sense a current pressure of an object, calculate the estimated remaining time to inflate the object to a target pressure, and display the remaining time using the inflation indicator. The user interface is configured to allow a user to enter the target pressure into the control device.

20 Claims, 14 Drawing Sheets

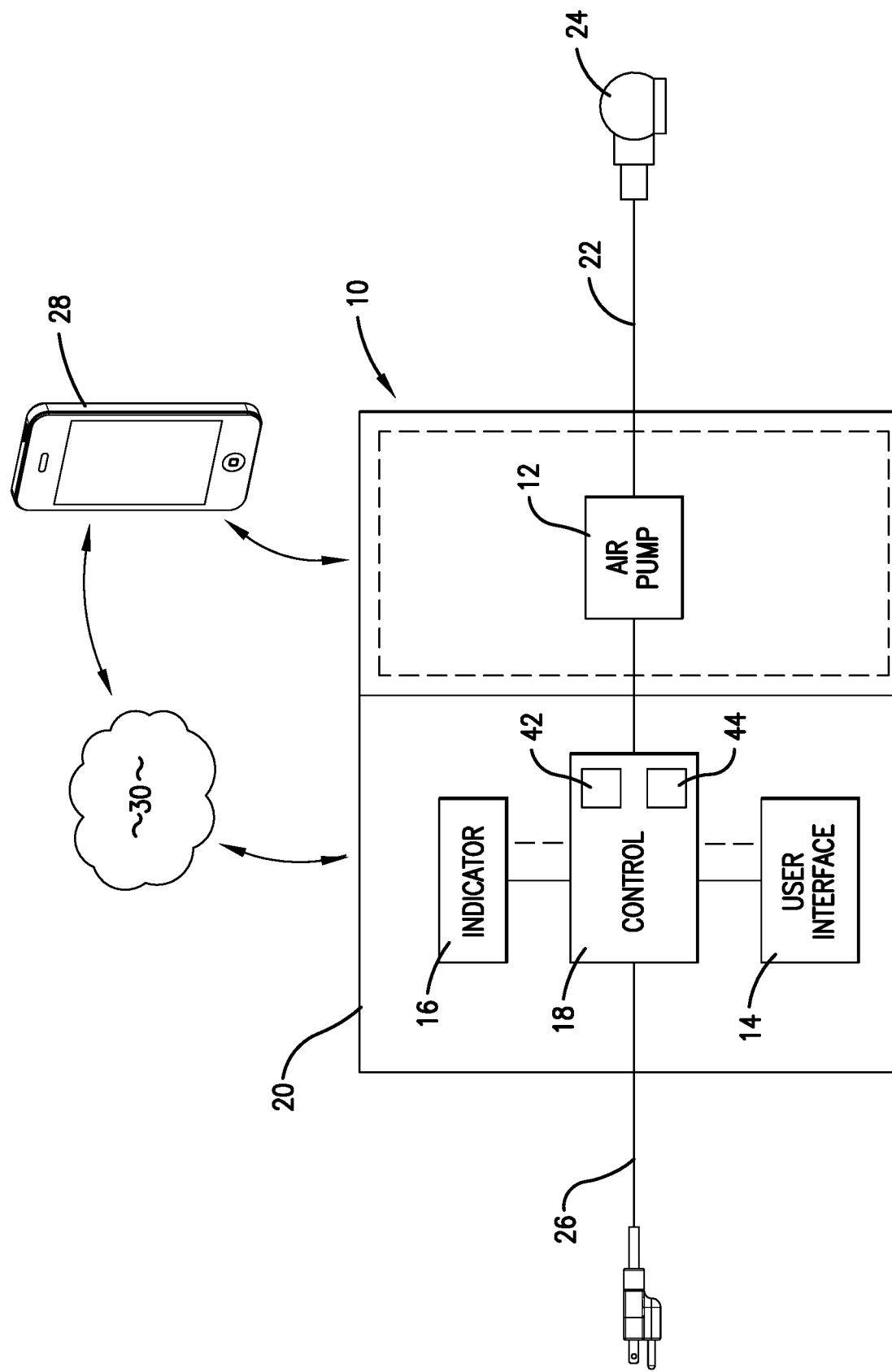

TIRE INFLATOR WITH INFLATION TIMER

RELATED APPLICATIONS

The present application is a continuation patent application and claims priority of co-pending application titled "TIRE INFLATOR WITH INFLATION TIMER", Ser. No. 15/794,173, filed Oct. 26, 2017, which claims priority to U.S. provisional application titled "TIRE INFLATOR WITH INFLATION TIMER", Ser. No. 62/413,091, filed Oct. 26, 2016, both of which are incorporated by reference herein in their entireties.

FIELD

The present invention relates to inflation devices, and more particularly, a portable inflation device for inflating tires and other objects.

BACKGROUND

Portable tire inflators are often used to inflate automobile tires, bicycle and motorcycle tires, trailer tires, rafts, and the like. To make such tire inflators sufficiently small and light-weight for portable use, the tire inflators must be equipped with relatively small air pumps that require several minutes to fully inflate some objects, especially large automobile tires. Because inflation times vary based on the sizes and pressure ratings of objects to be inflated, users do not know how long it will take to inflate a particular tire or other object. This wastes time because users must remain at the tire inflator and watch the tire inflator's pressure gauge until the object reaches full inflation. It is also potentially dangerous because tires often need to be inflated near heavy traffic, and remaining outside a vehicle near traffic to monitor the inflation progress places users in a vulnerable position. Further, not remaining at the inflator to monitor the inflation progress risks over-inflation, which may damage the object being inflated.

This background discussion is intended to provide information related to the present invention which is not necessarily prior art.

SUMMARY

The present invention solves the above-described and other problems by providing a portable inflation device that calculates when an object will be fully inflated and then displays or otherwise indicates the remaining inflation time so a user does not have to remain near the inflation device and monitor its progress.

An embodiment of the inflation device for inflating an object of the present invention broadly includes a pump, a user interface, an inflation indicator, and a control device. The pump generates pressurized gas or air and includes an elongated hose and an inflation nozzle configured to connect to the object. The user interface receives a target pressure from a user. The inflation indicator is coupled to the control device and is configured to display information concerning inflation of the object. The control device controls operation of the pump, determines a current pressure of the object, receives the target pressure from the user interface, calculates an estimated remaining time for running the air pump until the current pressure is within a predetermined margin of the target pressure, and displays the estimated remaining time on the inflation indicator.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 1 is a schematic depiction of an inflation device in accordance with an embodiment of the present invention;

Figure 1A:
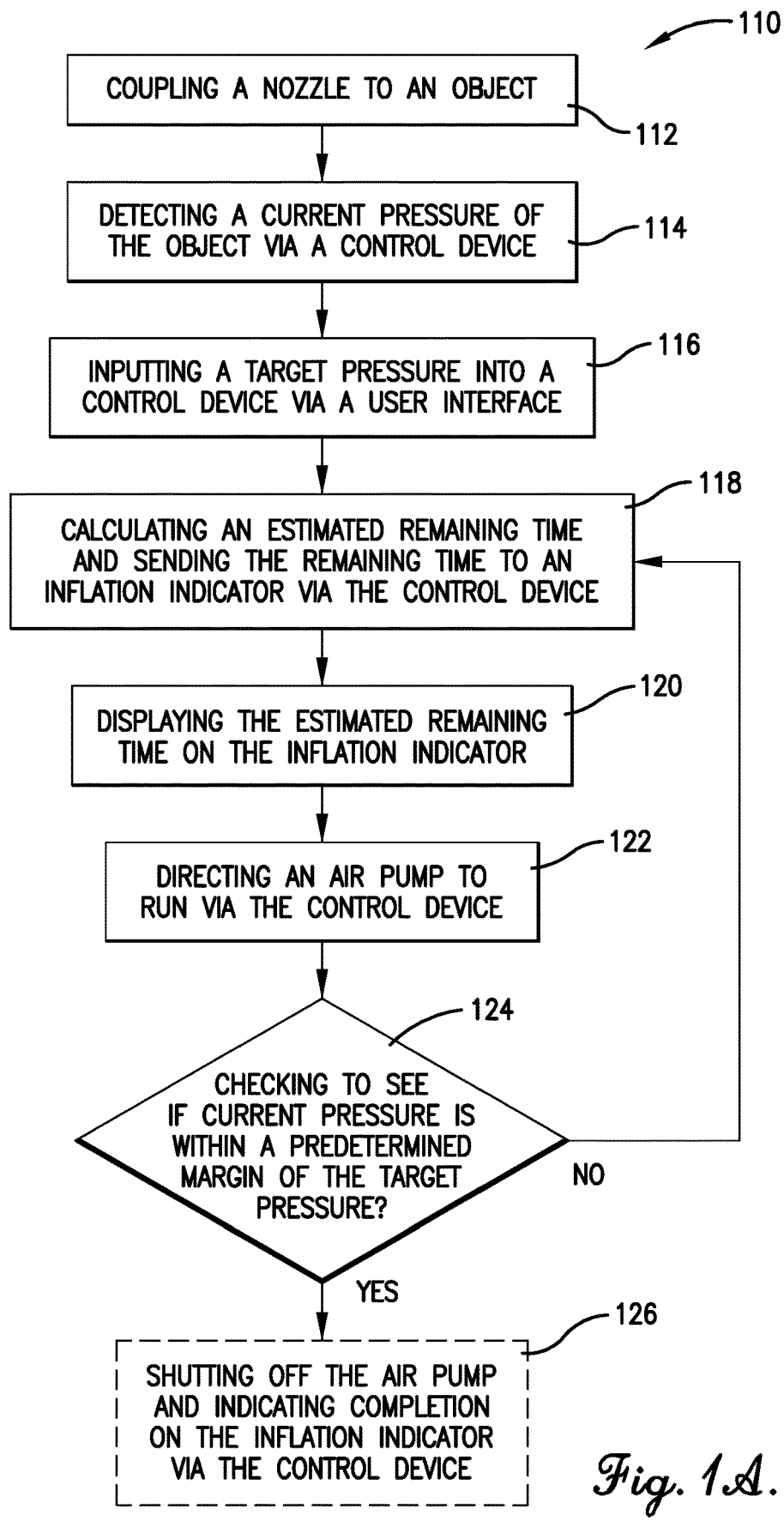
FIG. 1A is a flowchart of steps in an embodiment of inflating an object.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A portable inflation device 10 constructed in accordance with an embodiment of the invention is schematically shown in FIG. 1, and broadly includes an air pump or compressor 12, a user interface 14, an inflation indicator 16, and a control device 18. These and other components of the portable inflation device 10 may be enclosed within and/or mounted on a housing 20 or other enclosure.

The air pump 12 may be any conventional air pump known in the art and may include an internal compressor, pump, fan, or other mechanism for generating pressurized air. The air pump 12 includes an elongated air hose 22 with an inflation nozzle 24 on one end for delivering the pressurized air to a tire or other object. The air pump 12 may have any amperage or horsepower rating, and may be small and light enough for an average user to manually carry. The air pump 12 and/or the control device 18 may also have a sensor for sensing the current pressure of the tire or other object to which the air hose 22 and inflation nozzle 24 are attached.

The user interface 14 is wired to or wirelessly coupled with the control device 18 and allows a user to enter data and information for use by the control device 18. The user interface 14 may be an electronic device capable of wired or wireless coupling, such as a cell phone, laptop, computer, tablet, or the like, or an application, program, or website used by one of the aforementioned devices. Wired or wireless coupling may include signal or data transmitting and receiving circuits, such as antennas, transceivers, amplifiers, filters, mixers, oscillators, digital signal processors (DSPs), and the like. The user interface 14 may establish communication wirelessly by utilizing RF signals and/or data that comply with communication standards such as cellular 2G, 3G, or 4G, IEEE 802.11 standard such as WiFi®, IEEE 802.16 standard such as WiMAX, Bluetooth®, or combinations thereof. Alternatively, or additionally, the user interface 14 may establish communication through connectors or couplers that receive metal conductor wires or cables which are compatible with networking technologies such as ethernet. In certain embodiments, the user interface 14 may also couple with optical fiber cables.

In one embodiment, a user may operate the user interface 14 to enter a target inflation pressure into the control device 18. For example, the user may enter 36 pounds per square inch (psi) to instruct the control device 18 to inflate a tire or other object to approximately 36 psi. The user interface 14 may include any combination of buttons, switches, dials, touchscreen displays, or other inputs that may be manipulated by a user to enter information into the control device 18. The user interface 14 may even employ technologies such as radio frequency identification (RFID) readers, quick response (QR) code readers, and the like that communicate with RFID tags, QR codes, and the like on objects to be inflated so as to automatically detect a target inflation pressure for the objects.

The inflation indicator 16 is wired to or wirelessly coupled with the control device 18 and displays or otherwise indicates when a tire or other object will be fully inflated. For example, if a user enters a target pressure of 36 psi via the user interface 14 as described above, the control device 18 calculates the estimated amount of time to fully inflate the tire to this selected psi and then indicates this inflation time and possibly other information via the inflation indicator 16.

The inflation indicator 16 may be any device for displaying or otherwise indicating inflation time. For example, the inflation indicator 16 may be a countdown timer that displays a numeric and/or graphical indication of remaining inflation time; a series of lights that illuminate and/or change color to indicate inflation time; a beeper, tone generator, or other audible device that emits a series of sounds to indicate inflation time; a vibrator that vibrates to indicate inflation time; or any other visual, audible, or mechanical device that provides indications or alerts of inflation time.

The inflation indicator 16 may be positioned on the housing of the tire inflator so that it may be viewed or otherwise noticed by a user while standing near an object that is being inflated or may be positioned on the end of a power cord 26 so that it may be viewed or otherwise noticed by a user while sitting safely in a vehicle or near any other power source.

In some embodiments, the tire inflator 10 may include two or more inflation indicators, one of which may be positioned on the housing of the tire inflator and another of which may be positioned on the end of the power cord 26 or elsewhere. The tire inflator 10 may employ wireless communication technologies as described above to wirelessly transmit inflation times and/or other information to mobile communication devices 28 such as smart phones, smart watches, tablets, vehicle onboard computers, and other computing devices. The wireless communication may include a wireless network 30, as shown in FIG. 1.

Figure 2:
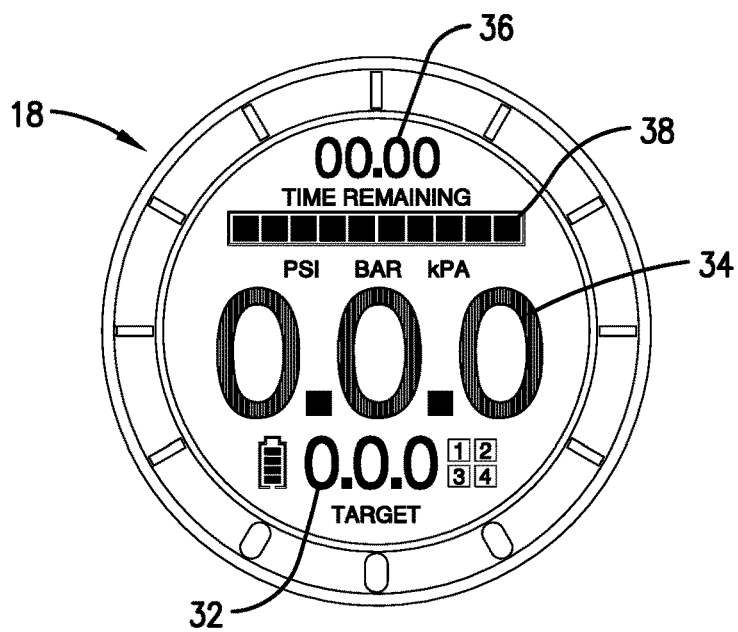
FIG. 2 is a plain view of an inflation indicator of the tire inflator of FIG. 1.
Figure 3:
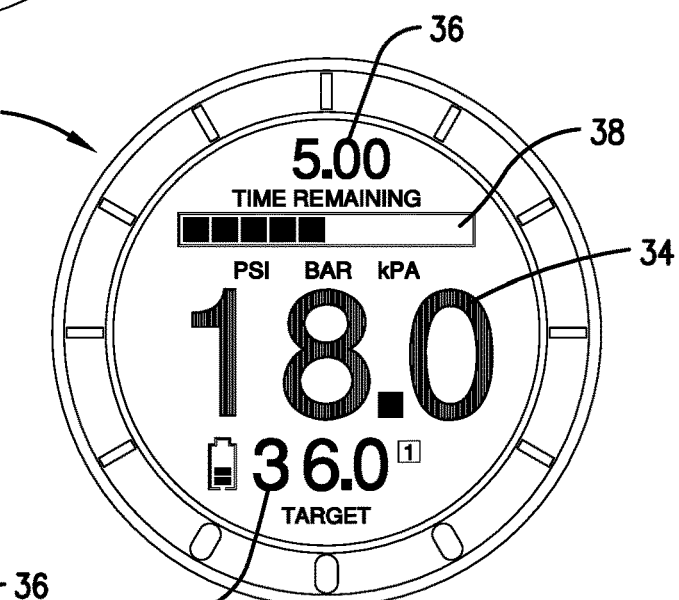
FIG. 3 is a variation of the inflation indicator of the tire inflator of FIG. 1.
Figure 4:
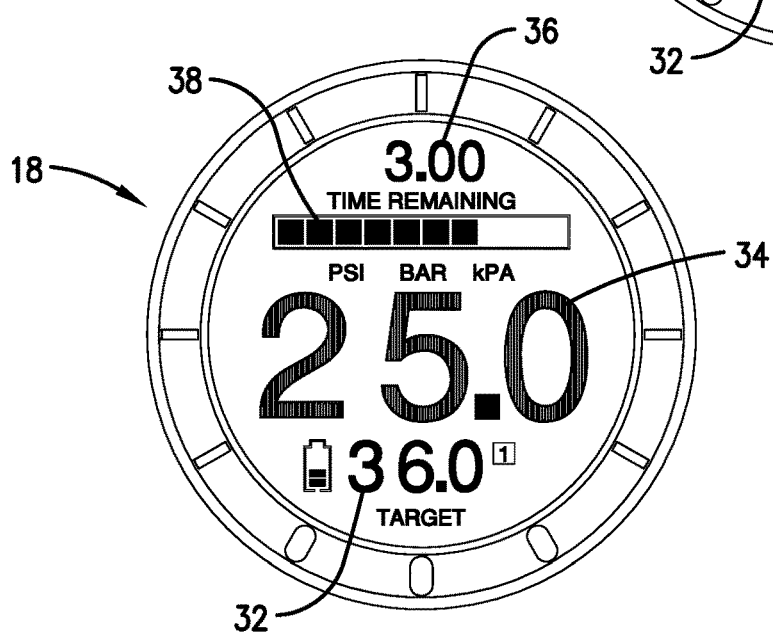
FIG. 4 is a variation of the inflation indicator of the tire inflator of FIG. 1.
Figure 5:
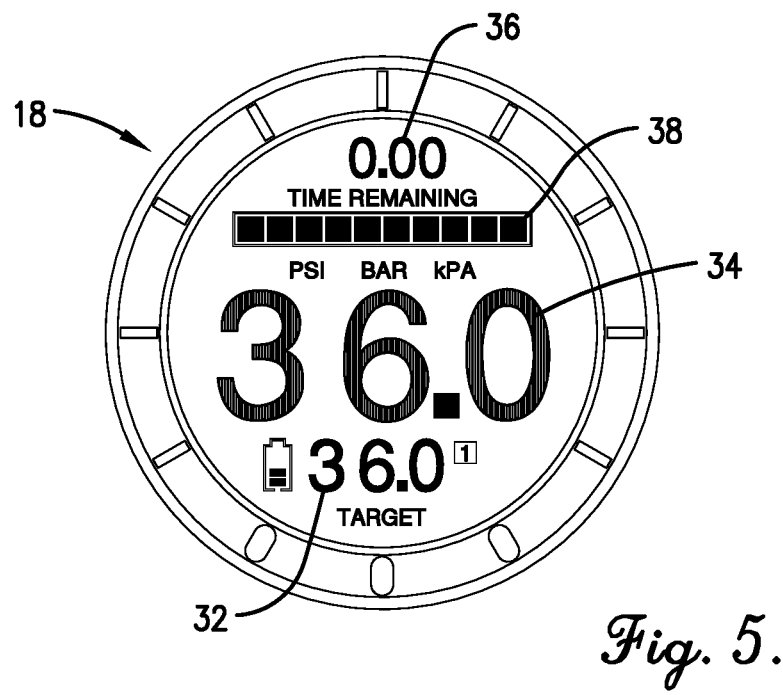
FIG. 5 is a variation of the inflation indicator of the tire inflator of FIG. 1.
Figure 6:
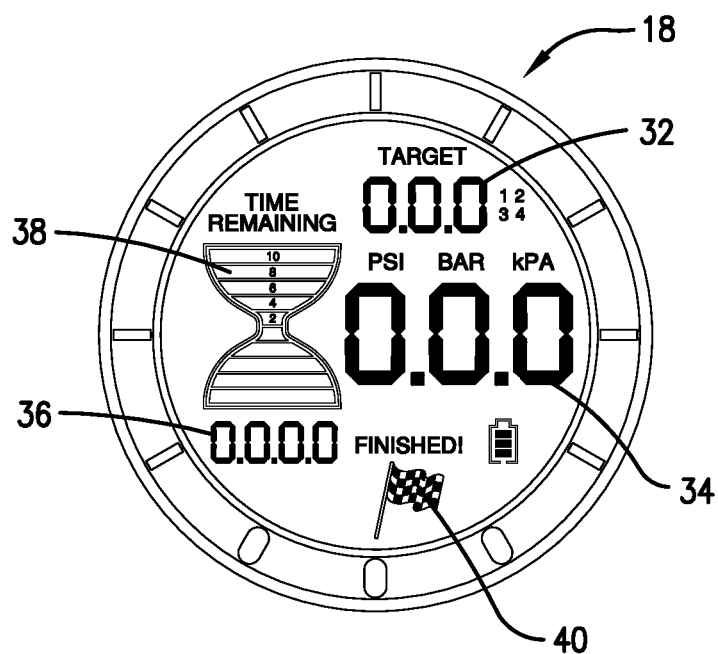
FIG. 6 is a variation of the inflation indicator of the tire inflator of FIG. 1.
Figure 7:
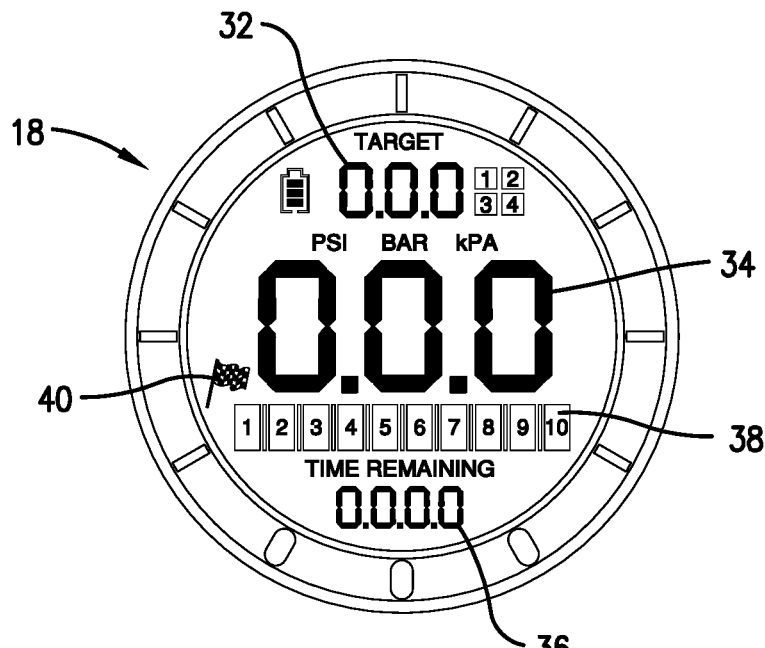
FIG. 7 is a variation of the inflation indicator of the tire inflator of FIG. 1.
Figure 8:
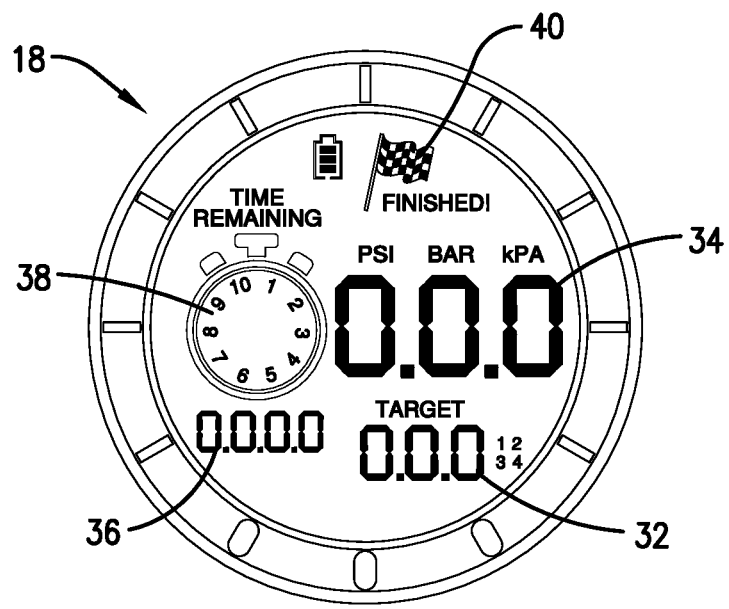
FIG. 8 is a variation of the inflation indicator of the tire inflator of FIG. 1.
Figure 9:
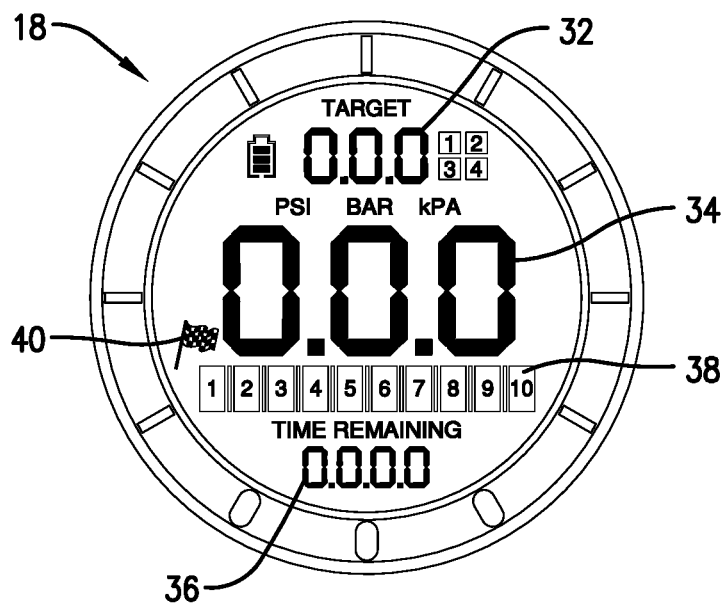
FIG. 9 is a variation of the inflation indicator of the tire inflator of FIG. 1.
Figure 10:
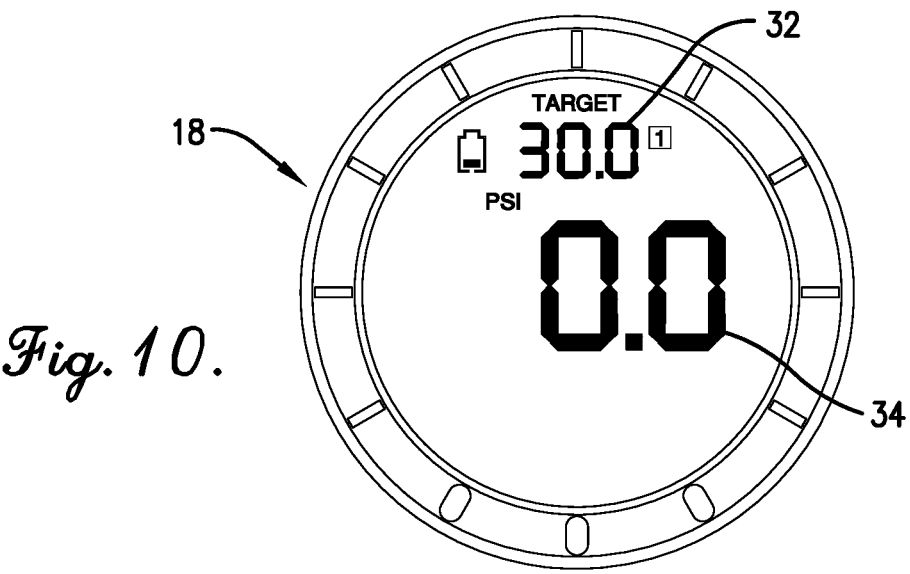
FIG. 10 is a variation of the inflation indicator of the tire inflator of FIG. 1.
Figure 11:
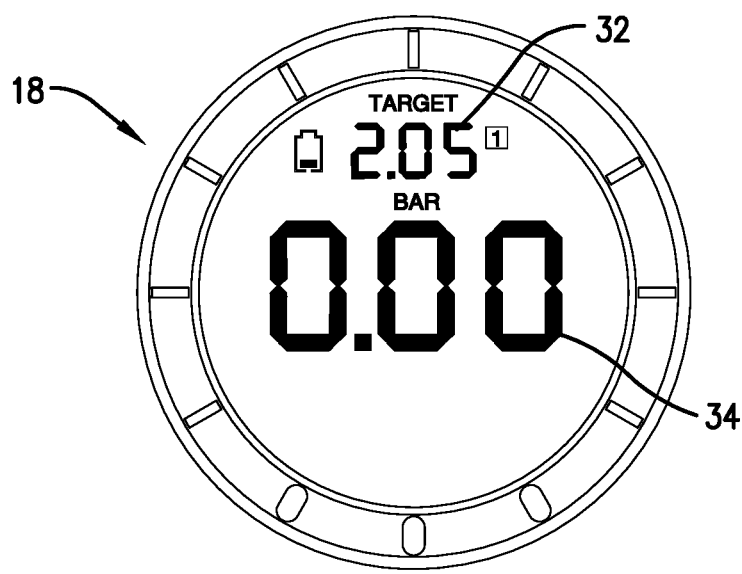
FIG. 11 is a variation of the inflation indicator of the tire inflator of FIG. 1.
Figure 12:
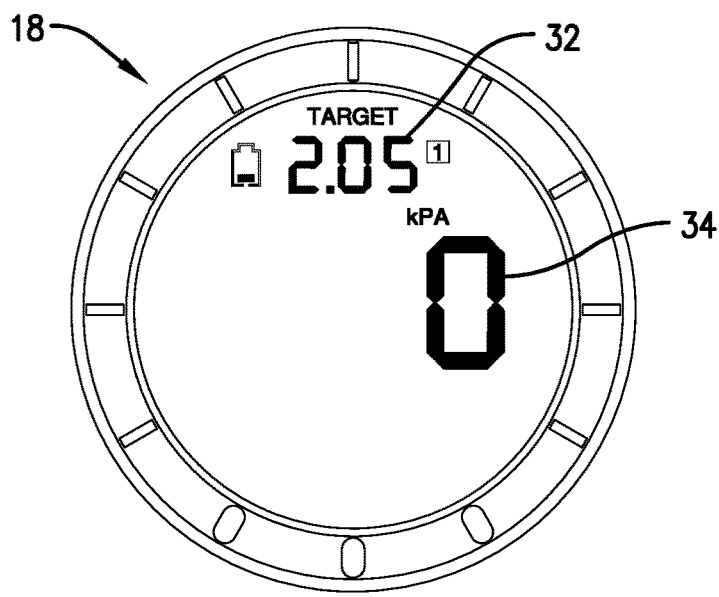
FIG. 12 is a variation of the inflation indicator of the tire inflator of FIG. 1.

Another embodiment of the inflation indicator 16 is shown in FIG. 2. This embodiment of the inflation indicator 16 includes an LED display or other digital display to visually indicate remaining inflation times and other information. The inflation indicator 16 includes a field 32 for indicating a target inflation pressure for an object to be inflated, a field 34 for indicating a current pressure of the object, a field 36 for numerically indicating how long it will take to inflate the object to the target inflation pressure, and a field 38 for graphically indicating inflation progress. The field 36 may be a static time or an active time, which indicates a time remaining. These fields 36, 38 are controlled and updated by the control device 18 to indicate the inflation progress for a tire or other object. For example, FIG. 3 shows the inflation indicator 16 with "36" in the field 32 for indicating a desired inflation pressure of 36 psi, "18" in the field 34 for indicating a current pressure of 18 psi, "5" in the field 36 for numerically indicating it will take approximately 5 minutes longer to fully inflate the object to 36 psi, and 5 bars (out of 10) illuminated in the field 38 for graphically indicating the inflation progress. FIG. 4 shows the inflation indicator 16 further in an inflation process with "36" in the target pressure field 32, "25" in the current pressure field 34, "3" in the remaining inflation time field 36, and 7 bars (out of 10) in the inflation progress field 38. Likewise, FIG. 5 shows the inflation indicator 16 at the end of an inflation process with "36" in the target pressure field 32, "36" in the current pressure field 34, "0" in the remaining inflation time field 36, and 10 bars (out of 10) in the inflation progress field 38.

Figure 35:
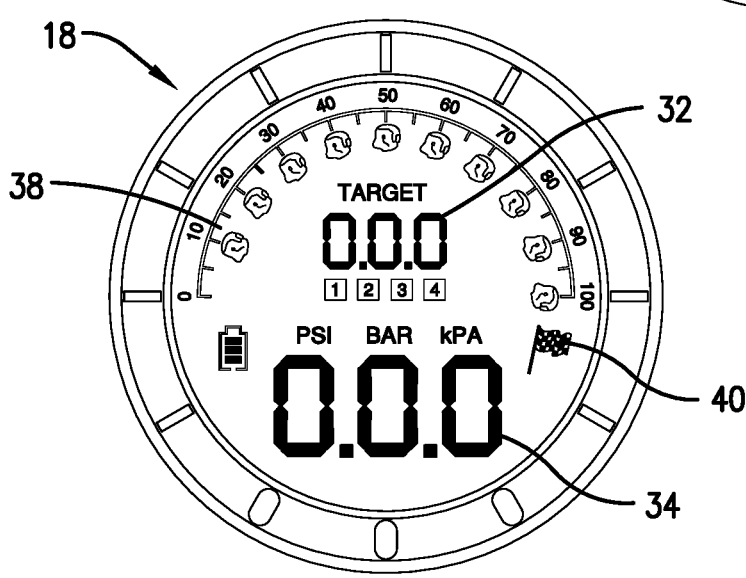
FIG. 35 is a variation of the inflation indicator of the tire inflator of FIG. 1.

The field 38 can be of any shape. For example, the field 38 may be in the shape of an hourglass, as shown in FIGS. 6, 23, and 27-30. The field 38 may also be a stopwatch, as shown in FIGS. 8, 16, 20-22, and 32. The field 38 may also be an arced shape, as shown in FIGS. 35-35. The inflation indicator 16 may also include a symbol 40 that indicates when inflation is complete, as shown in FIGS. 6-8, 9, 16, 23, and 30-35.

Figure 13:
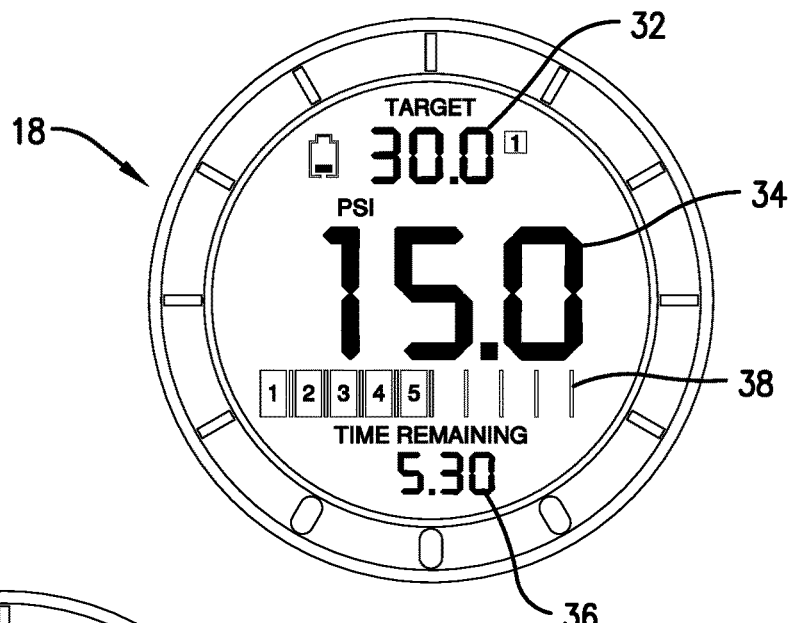
FIG. 13 is a variation of the inflation indicator of the tire inflator of FIG. 1.
Figure 14:
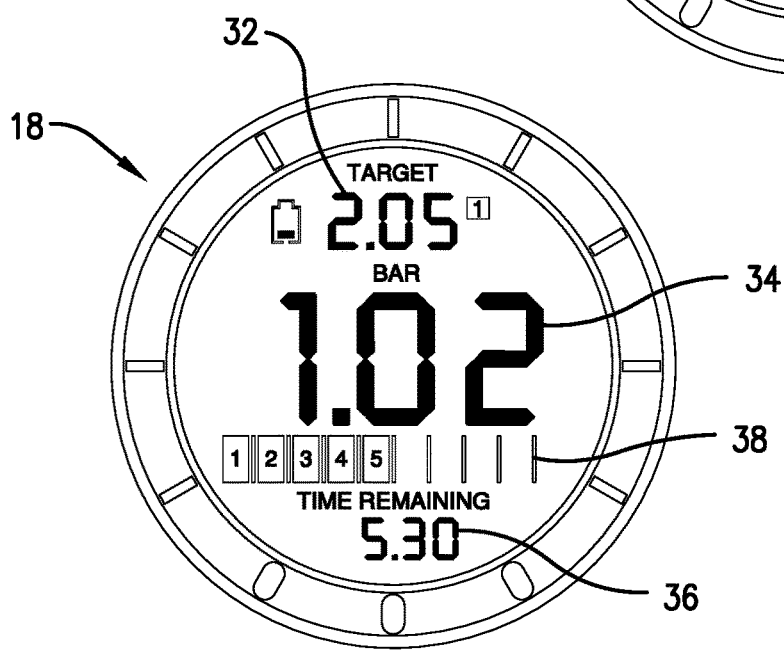
FIG. 14 is a variation of the inflation indicator of the tire inflator of FIG. 1.
Figure 15:
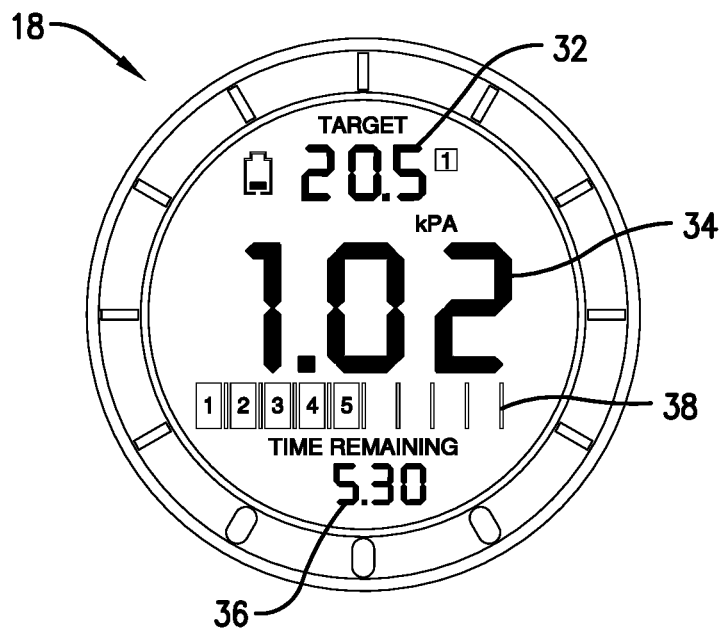
FIG. 15 is a variation of the inflation indicator of the tire inflator of FIG. 1.
Figure 16:
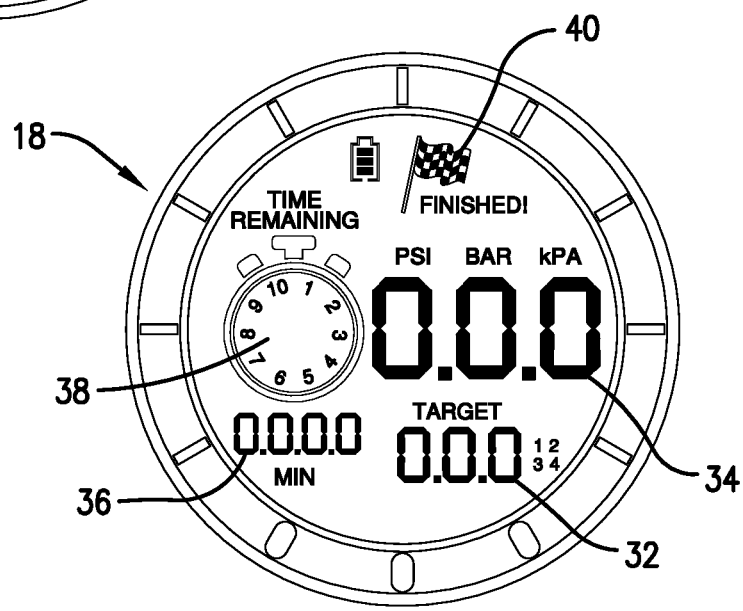
FIG. 16 is a variation of the inflation indicator of the tire inflator of FIG. 1.
Figure 17:
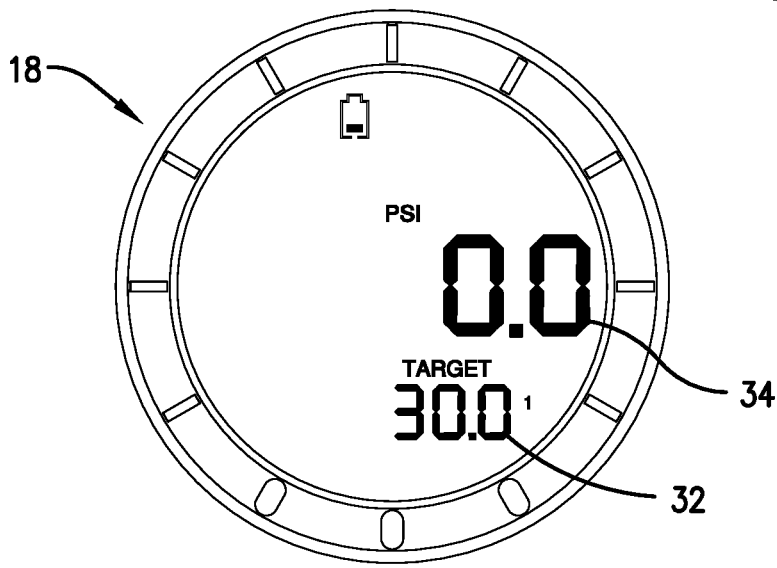
FIG. 17 is a variation of the inflation indicator of the tire inflator of FIG. 1.
Figure 18:
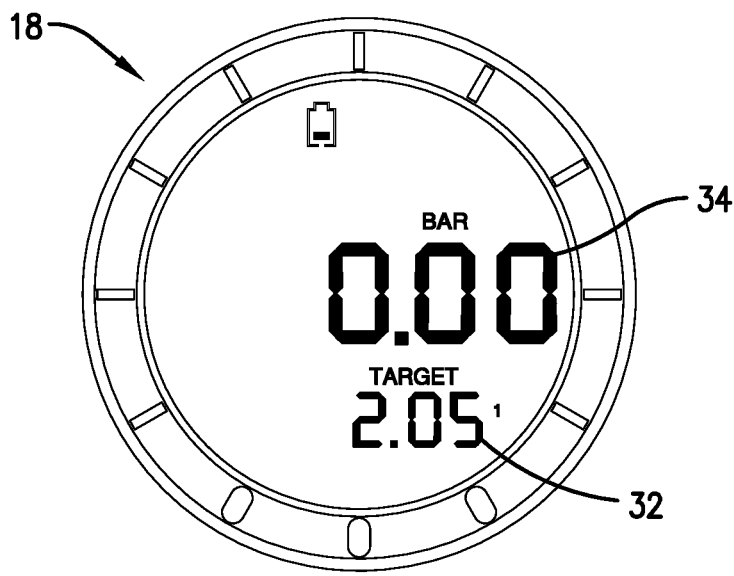
FIG. 18 is a variation of the inflation indicator of the tire inflator of FIG. 1.
Figure 19:
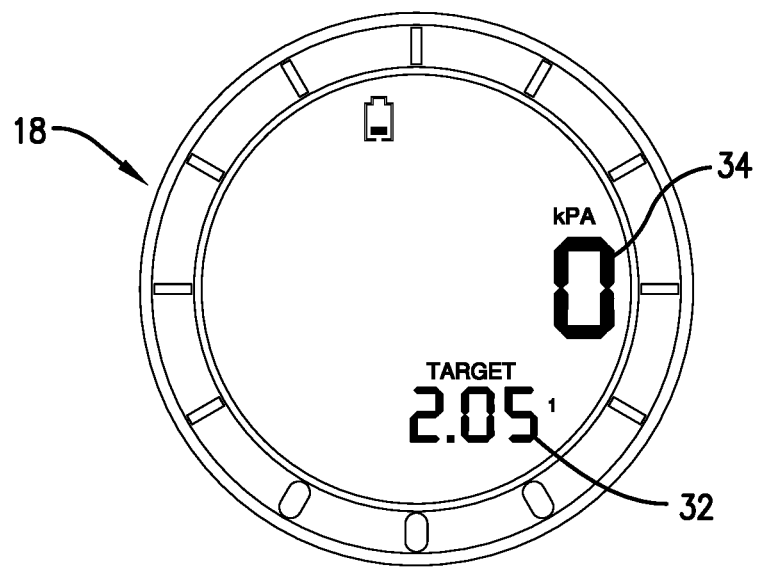
FIG. 19 is a variation of the inflation indicator of the tire inflator of FIG. 1.
Figure 20:
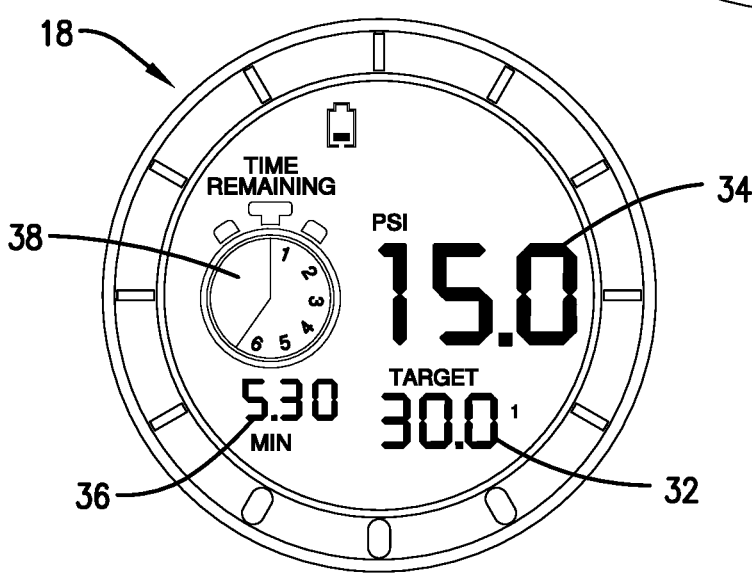
FIG. 20 is a variation of the inflation indicator of the tire inflator of FIG. 1.
Figure 21:
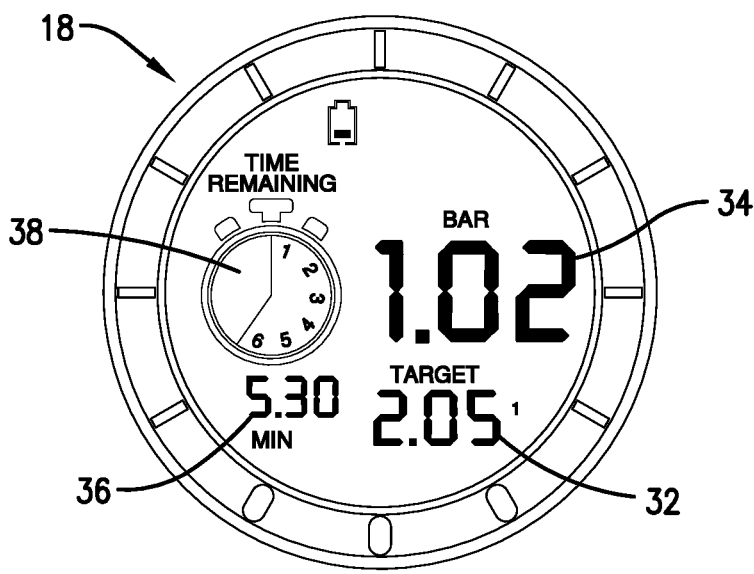
FIG. 21 is a variation of the inflation indicator of the tire inflator of FIG. 1.
Figure 22:
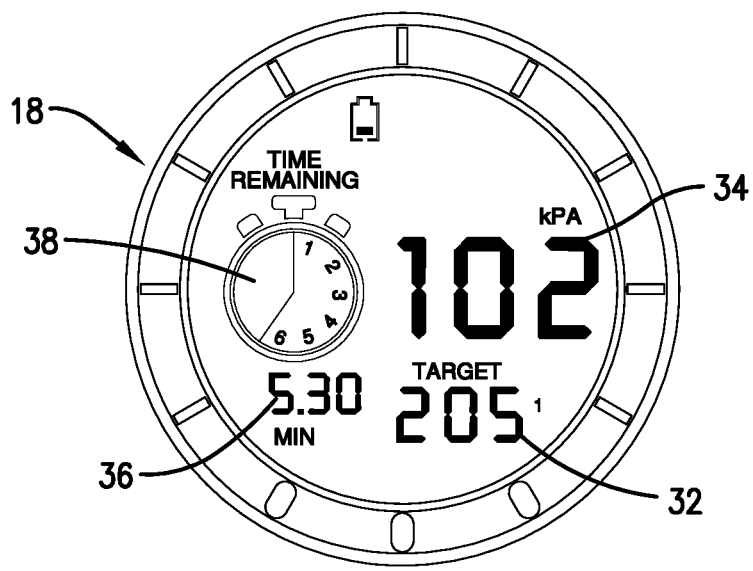
FIG. 22 is a variation of the inflation indicator of the tire inflator of FIG. 1.
Figure 23:
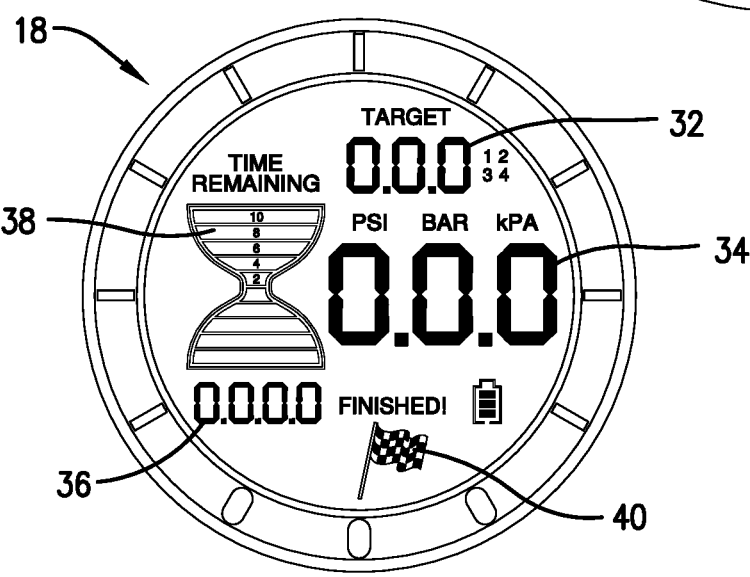
FIG. 23 is a variation of the inflation indicator of the tire inflator of FIG. 1.
Figure 24:
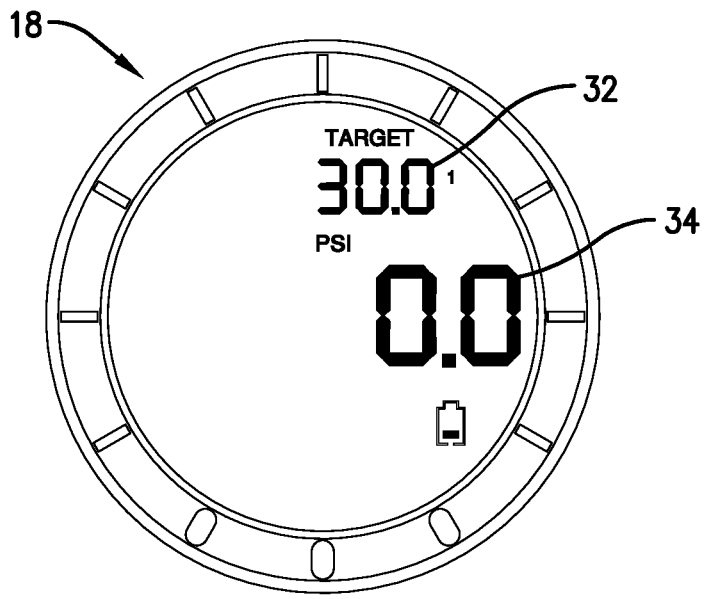
FIG. 24 is a variation of the inflation indicator of the tire inflator of FIG. 1.
Figure 25:
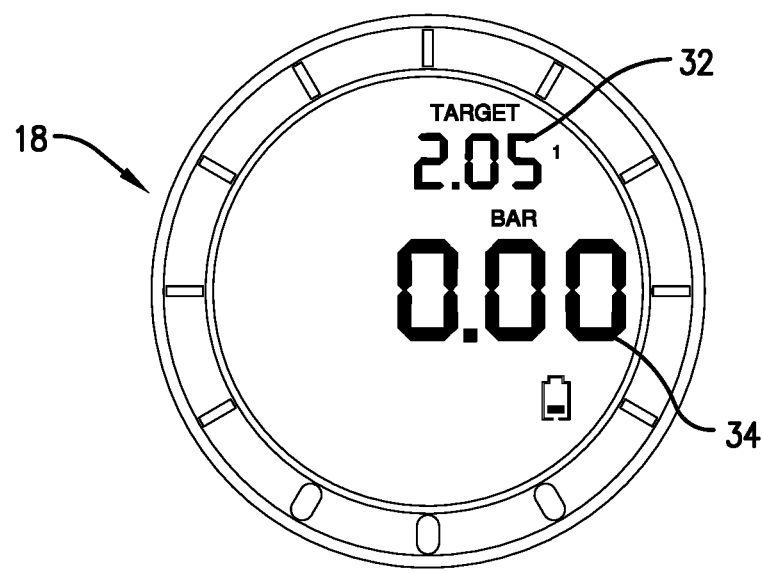
FIG. 25 is a variation of the inflation indicator of the tire inflator of FIG. 1.
Figure 26:
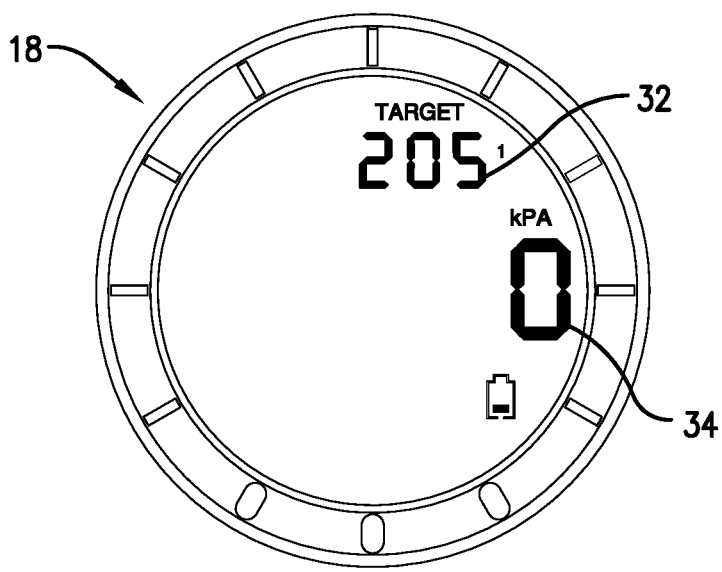
FIG. 26 is a variation of the inflation indicator of the tire inflator of FIG. 1.
Figure 27:
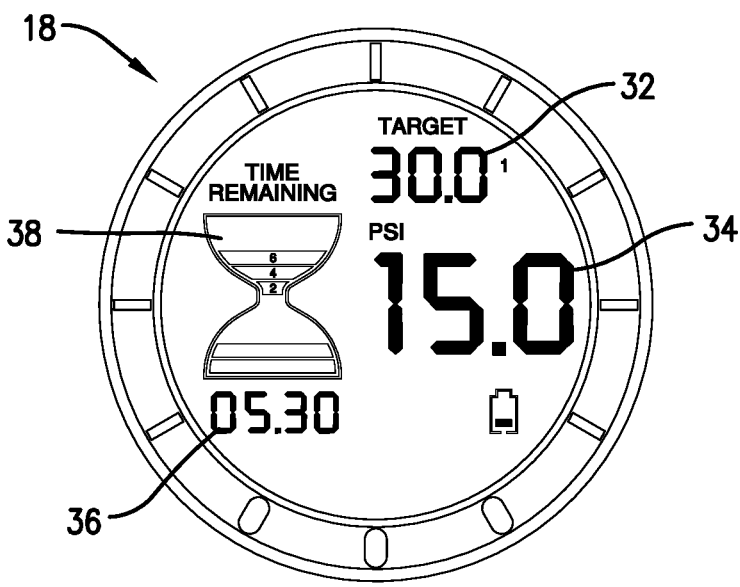
FIG. 27 is a variation of the inflation indicator of the tire inflator of FIG. 1.
Figure 28:
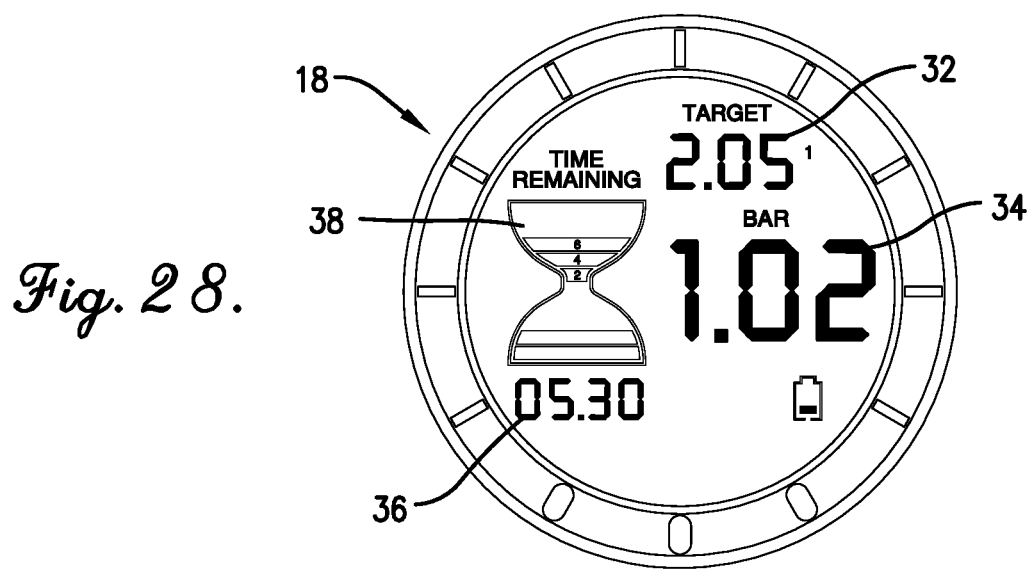
FIG. 28 is a variation of the inflation indicator of the tire inflator of FIG. 1.
Figure 29:
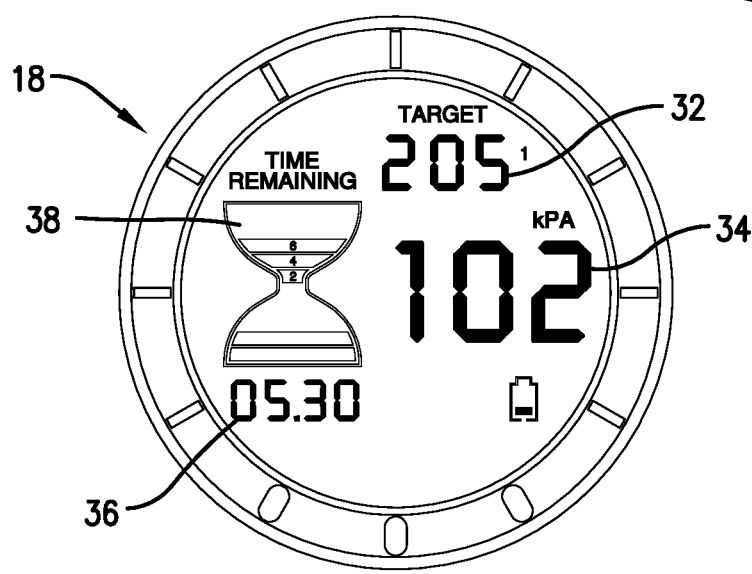
FIG. 29 is a variation of the inflation indicator of the tire inflator of FIG. 1.
Figure 30:
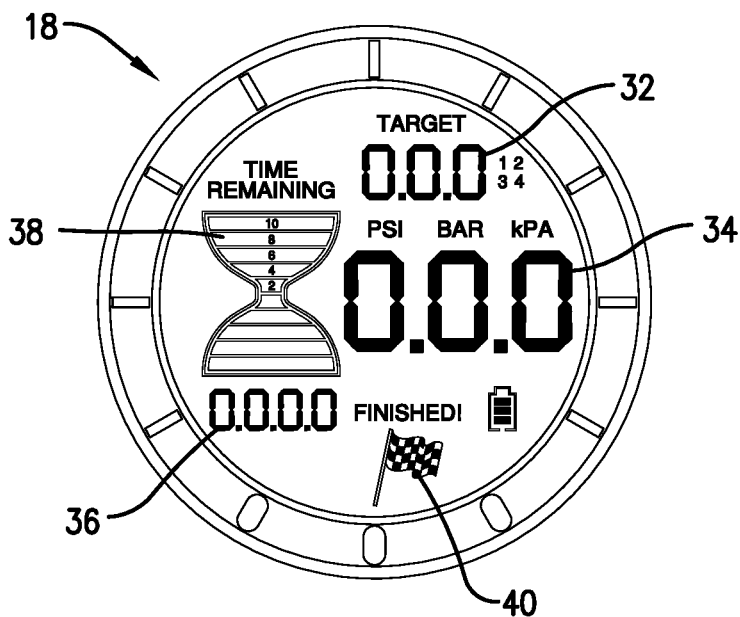
FIG. 30 is a variation of the inflation indicator of the tire inflator of FIG. 1.
Figure 31:
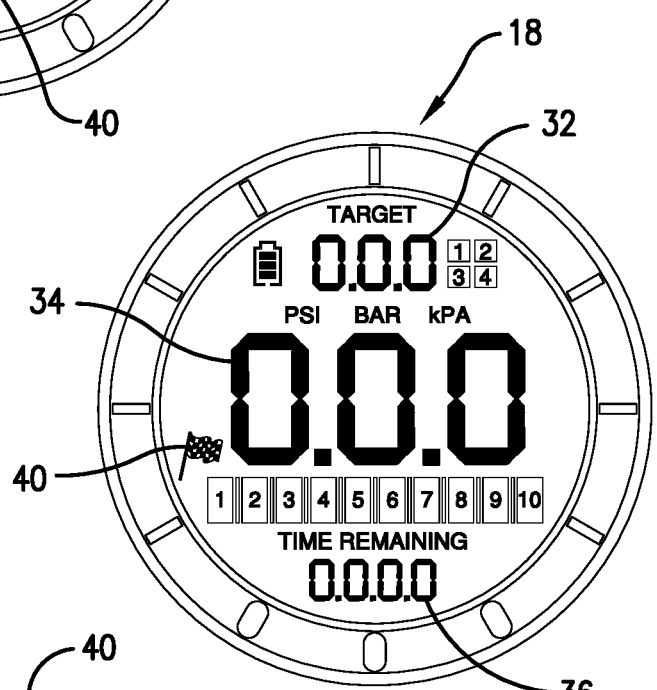
FIG. 31 is a variation of the inflation indicator of the tire inflator of FIG. 1.
Figure 32:
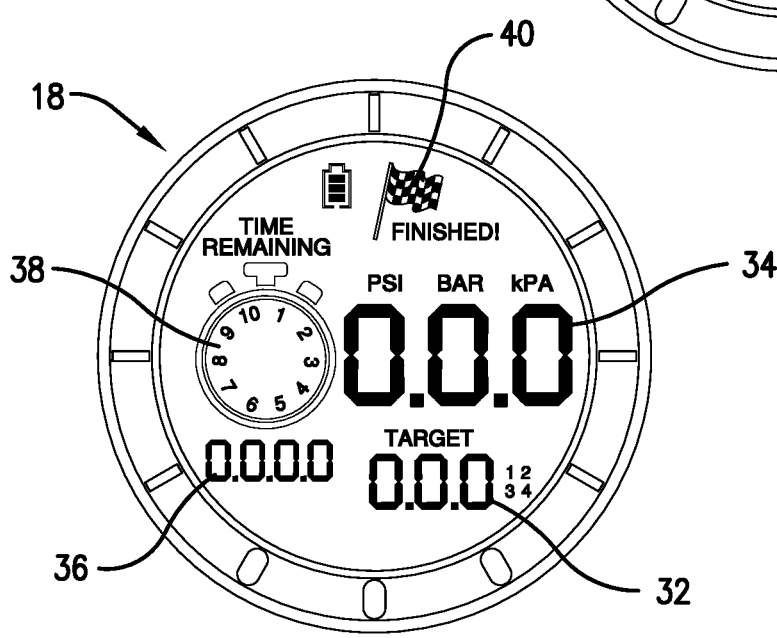
FIG. 32 is a variation of the inflation indicator of the tire inflator of FIG. 1.
Figure 33:
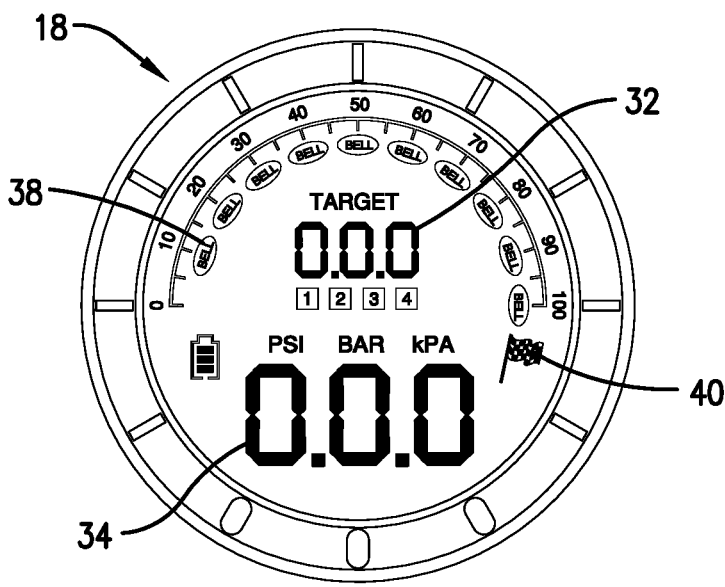
FIG. 33 is a variation of the inflation indicator of the tire inflator of FIG. 1.
Figure 34:
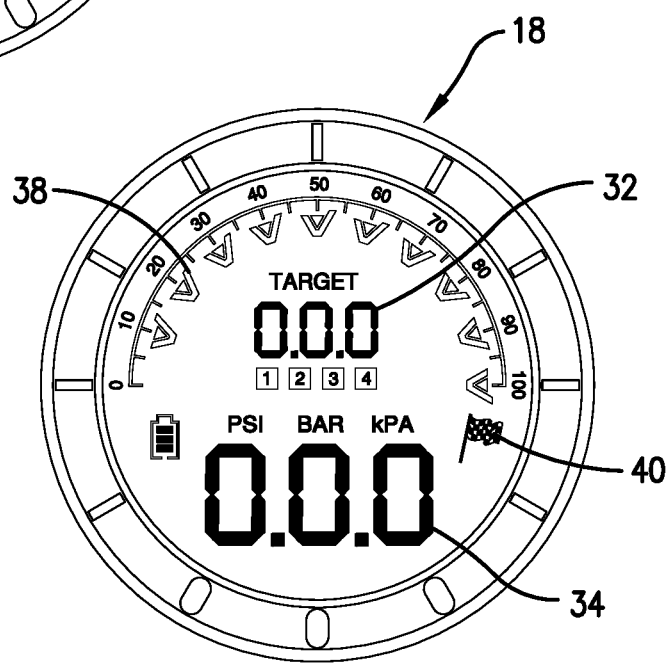
FIG. 34 is a variation of the inflation indicator of the tire inflator of FIG. 1.

The inflation indicator 16 may also display field 32 and field 34 in any unit of pressure including psi, bars, or kilopascals, as shown in FIGS. 10-15, 17-22, and 24-29. In FIGS. 13, 20, and 27, field 34 displays the current pressure at 15 psi. In FIGS. 14, 21, and 28, field 34 shows this same pressure in bars, which is 1.02. In FIGS. 15, 22, and 29, field 34 shows that same pressure in kilopascals, which is 102. In FIGS. 10, 13, 17, 20, 24, and 27, field 32 displays the target pressure of 30 psi. In FIGS. 11, 14, 18, 21, 25, and 28, field 32 shows this same pressure in bars, which is 2.05. In FIGS. 12, 15, 19, 22, 26, and 29, field 32 shows that same pressure in kilopascals, which is 205.

In some embodiments of the inflation indicator 16, the user interface 14 is on a bottom portion of the inflation indicator 16. The inflation indicator 16 could include any combination of the items described above without departing from the scope of this invention.

The control device 18 controls the operation of the air pump 12. In accordance with an aspect of the invention, the control device 18 may be configured to sense a current pressure of the object being inflated, calculate the estimated remaining time to fully inflate the object, and display or otherwise indicate this and other information as described below.

The control device 18 may comprise any number or combination of processors 42. The processor 42 may include controllers, sensors, circuits, integrated circuits, programmable logic devices such as programmable logic controllers (PLC) or motion programmable logic controllers (MPLC), computers, microcontrollers, transmitters, receivers, other electrical and computing devices, and/or residential or external memory for storing data and other information accessed and/or generated by the tire inflator 10. The control device 18 may control and/or sense operational sequences. The control device 18 and computer programs described herein are merely examples of computer equipment and programs that may be used to implement the present invention and may be replaced with or supplemented with other controllers and computer programs without departing from the scope of the present invention.

The control device 18 may implement the computer programs and/or code segments to perform various functions described herein. The computer programs may comprise an ordered listing of executable instructions for implementing logical functions in the control device 18. The computer programs may be embodied in any computer-readable medium for use by or in connection with an instruction execution system, apparatus, or device, and execute the instructions. In the context of this application, a "computer-readable medium" may be any physical medium that can contain, store, communicate, propagate, or transport the program for use by or in connection with the instruction execution system, apparatus, or device. The computer-readable medium may be, for example, but not limited to, an electronic, magnetic, optical, electro-magnetic, infrared, or semi-conductor system, apparatus, or device. More specific, although not exclusive, examples of the computer-readable medium may include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RS MMC), secure digital (SD) cards such as microSD or miniSD, and a subscriber identity module (SIM) card.

The residential or external memory 44 may be integral with the control device 18, stand-alone memory, or a combination of both. The memory 44 may include, for example, removable and non-removable memory elements such as RAM, ROM, flash, magnetic, optical, USB memory devices, MMC cards, RS MMC cards, SD cards such as microSD or miniSD, SIM cards, and/or other memory elements. The control device 18 may be integrated into the air pump 12 or may be a standalone device that is wired to the air pump 12. The air pump 12 and control device 18 may receive power from the power cord 26 that plugs into a 12V DC accessory socket such as a vehicle cigarette lighter receptacle or a 120V AC receptacle.

In use, a user couples the nozzle 24 with a tire valve, corresponding to step 112 of FIG. 1A. The control device 18 detects the current pressure of the tire (step 114). The user inputs a target pressure into the user interface 14 which transmits the target pressure to the control device 18 (step 116). The control device 18 calculates the amount of time it will take to achieve the target pressure and sends this time to the inflation indicator 16 (step 118). The inflation indicator 16 displays this time (step 120). The user then directs the control device 18 via the user interface 14 to initiate inflation. The control device 18 directs the air pump 12 to begin pumping pressurized air into the tire (step 122). The control device 18 continuously detects the tire pressure, re-calculates the estimated remaining time until the target pressure is reached, and sends the remaining time and the current pressure to the inflation indicator 16 (step 124). The target pressure may be considered reached when the current pressure is within a predetermined margin of the target pressure. The predetermined margin may be a certain percentage of the target pressure, such as 1%, 5%, 10%, etc. The inflation indicator 16 displays the remaining time and the current pressure. In one embodiment, the control device 18 may automatically shut off the air pump 12 when the target pressure is achieved (step 126). In another embodiment, the control device 18 may indicate the target pressure has been reached via the inflation indicator 16, or through an electronic transmission (such as a wireless message) to a mobile communication device such as a smart phone, smart watch, vehicle onboard computer, and the like, or through a visual and/or audio indicator (also step 126).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A portable inflation device for inflating an object, the portable inflation device comprising:
   a pump including an elongated hose, and an inflation nozzle in fluid communication with the elongated hose and configured to connect to the object;
   a user interface attached to the pump and configured to receive a first signal representative of a target pressure;
   a control device coupled to the user interface and configured to—
      control operation of the pump,
      determine a current pressure of the object,
      receive a second signal representative of the target pressure from the user interface,
      calculate an estimated remaining time for running the pump until the current pressure is within a predetermined margin of the target pressure, and
      transmit a third signal representative of the estimated remaining time; and
   an inflation indicator wirelessly coupled to the control device and configured to—
      receive the third signal representative of the estimated remaining time, and
      display the estimated remaining time.

2. The portable inflation device of claim 1, wherein the user interface is wirelessly coupled to the control device.

3. The portable inflation device of claim 2, wherein the control device is configured to wirelessly couple with a mobile communication device and transmit the third signal to the mobile communication device.

4. The portable inflation device of claim 3, wherein the control device is configured to send a fourth signal representative of a notification to the mobile communication device when the current pressure is within the predetermined margin of the target pressure.

5. The portable inflation device of claim 2, wherein the control device is configured to wirelessly couple with an onboard computer of a vehicle and transmit the third signal to the onboard computer of the vehicle.

6. The portable inflation device of claim 1, wherein the control device is configured to shut off the pump when the current pressure is within the predetermined margin of the target pressure.

7. The portable inflation device of claim 1, wherein the inflation indicator is configured to display the current pressure and the target pressure.

8. The portable inflation device of claim 1, wherein the inflation indicator is configured to display a field that graphically indicates inflation progress.

9. The portable inflation device of claim 7, wherein the user interface is configured to receive a selected unit of measurement in which to display pressure, the control device is configured to convert the current pressure and target pressure to the selected unit of measurement, and the inflation indicator is configured to display the current pressure and target pressure in the selected unit of measurement.

10. The portable inflation device of claim 1, further including a power cord for connecting the portable inflation device to a power source, wherein the inflation indicator is positioned on an end of the cord.

11. The portable inflation device of claim 1, wherein the inflation indicator is configured to display an indicator when the estimated time remaining has expired.

12. The portable inflation device of claim 1, wherein the inflation indicator comprises a vibration device configured to activate when the estimated time remaining has expired.

13. The portable inflation device of claim 1, wherein the inflation indicator comprises a sound-making device configured to activate when the estimated time remaining has expired.

14. The portable inflation device of claim 1, wherein the user interface includes an RFID reader or a QR code reader configured to read an RFID tag or QR code that has the target pressure for the object embedded therein.

15. A portable inflation device for inflating an object, the portable inflation device comprising:
   a pump comprising—
      an elongated hose,
      an inflation nozzle configured to connect to the object, and
      a sensor configured to detect the current pressure of the object;
   a control device coupled to the sensor and configured to—
      receive a first signal representative of the current pressure of the object from the sensor of the pump, and
      transmit a second signal representative of the current pressure;
   a power cord having a first end for connecting to a power source and a second end for connecting to the control device; and
   an inflation indicator positioned on the first end of the power cord and configured to receive the second signal from the control device and display the current pressure.

16. The portable inflation device of claim 15, wherein the inflation indicator is wired to the control device and configured to receive the second signal through wired communication.

17. The portable inflation device of claim 15, wherein the control device is configured to wirelessly couple with a mobile communication device and transmit the second signal to the mobile communication device.

18. The portable inflation device of claim 15, wherein the control device is configured to wirelessly couple with an onboard computer of a vehicle and transmit the second signal to the onboard computer of the vehicle.

19. The portable inflation device of claim 15, further comprising an RFID reader or QR code reader configured to read an RFID tag or QR code that has a target pressure for the object embedded therein.

20. A portable inflation device for inflating an object, the portable inflation device comprising:
  a pump comprising—
    an elongated hose,
    an inflation nozzle configured to connect to the object, and
    a sensor configured to detect the current pressure of the object;
  a user interface attached to the pump and configured to receive a first signal representative of a target pressure;
  a control device coupled to the user interface and configured to—
    control operation of the pump,
    receive a second signal representative of the current pressure of the object from the sensor of the pump,
    receive the first signal representative of the target pressure from the user interface,
    calculate an estimated remaining time for running the pump until the current pressure is within a predetermined margin of the target pressure, and
    transmit a third signal representative of the estimated remaining time, the current pressure, and the target pressure;
  a power cord having a first end for connecting to a power source and a second end for connecting to the control device; and
  an inflation indicator positioned on the first end and configured to receive the third signal from the control device and display the estimated remaining time, the target pressure, and the current pressure.

\* \* \* \* \*